Dec. 14, 1937.  W. C. McNITT  2,102,475
SLICING MACHINE
Original Filed Dec. 6, 1934  5 Sheets-Sheet 1
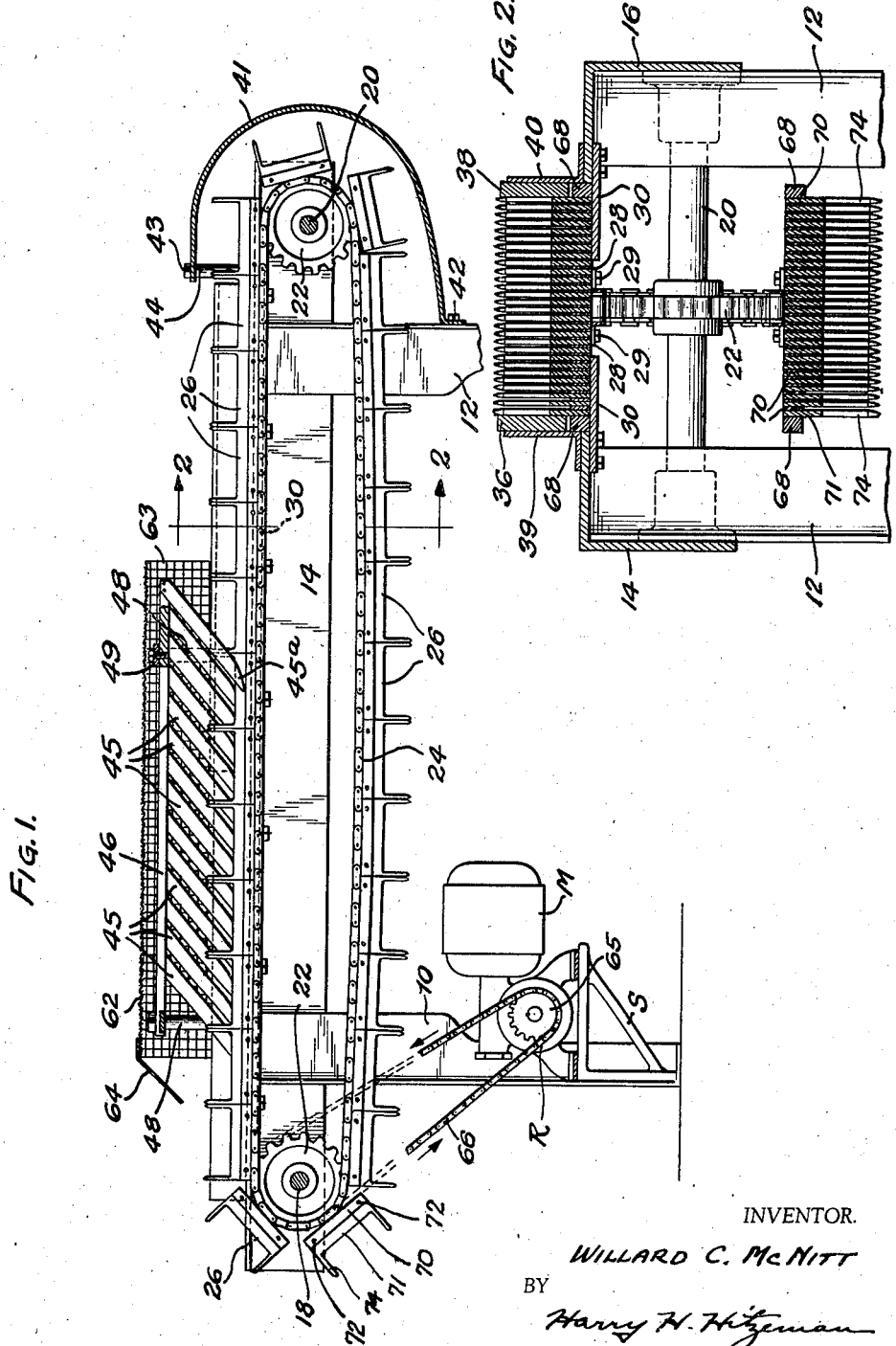
INVENTOR.
WILLARD C. McNITT
BY Harry H. Hitzeman
ATTORNEY.

Dec. 14, 1937.    W. C. McNITT    2,102,475
SLICING MACHINE
Original Filed Dec. 6, 1934    5 Sheets-Sheet 2
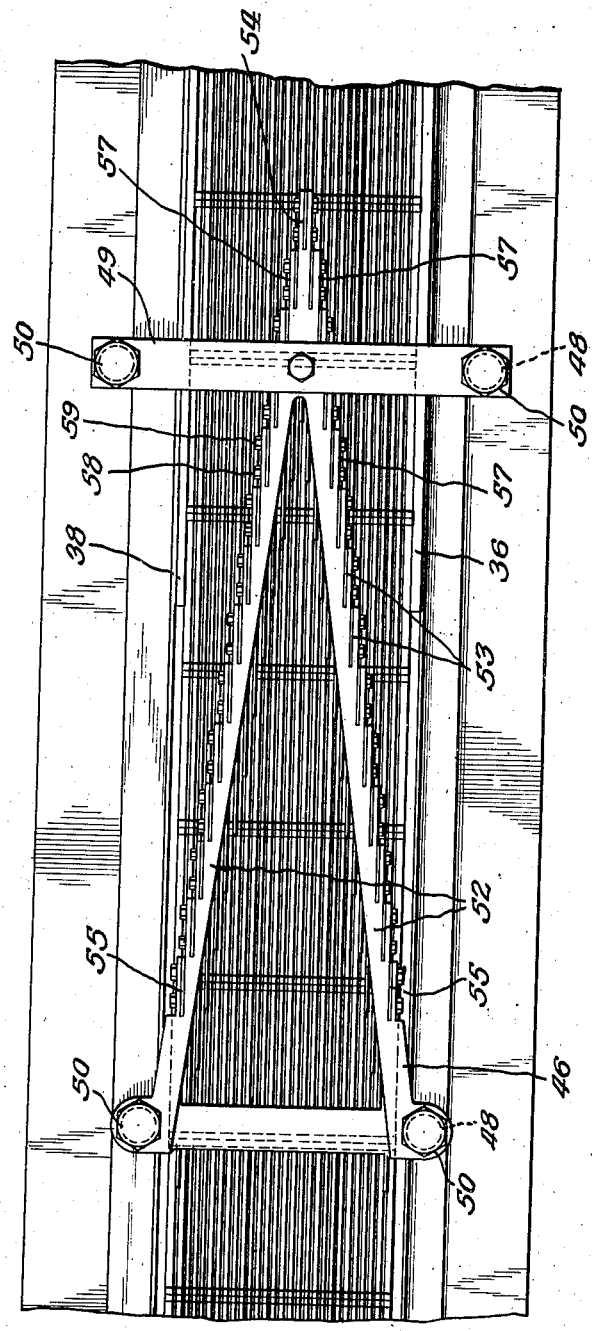
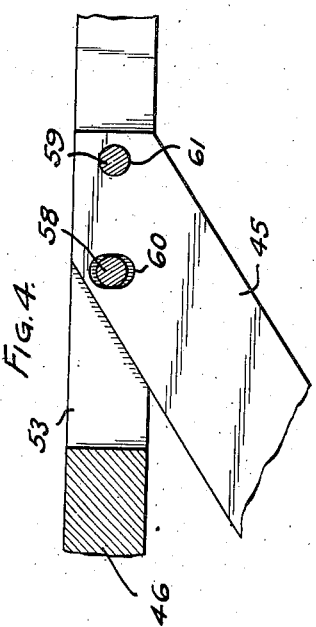
INVENTOR.
WILLARD C. McNITT
BY
Harry H. Hitzeman
ATTORNEY.

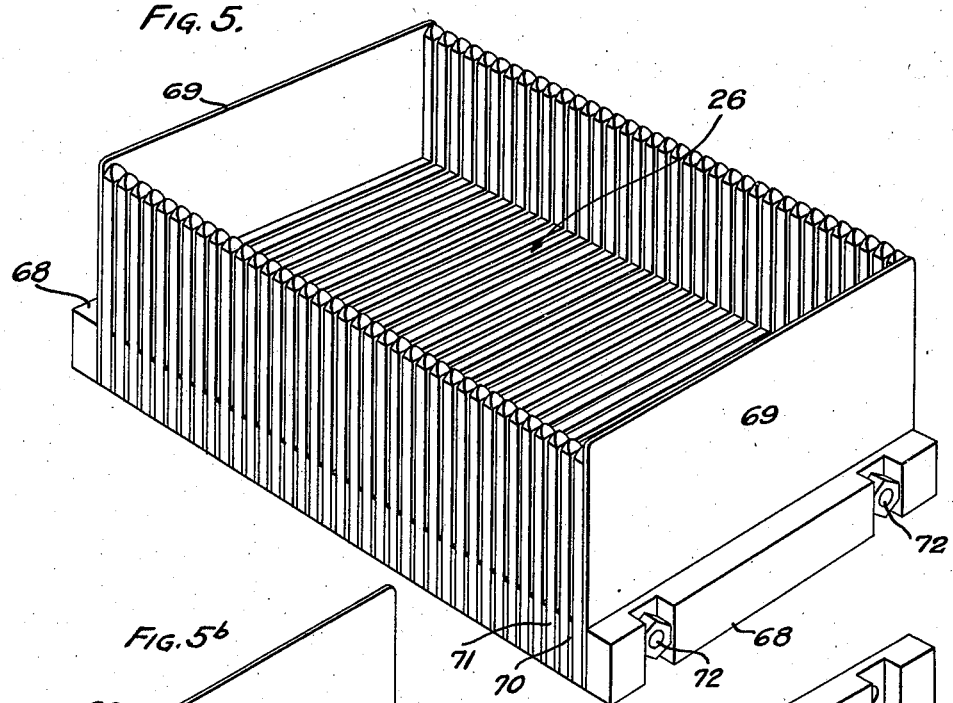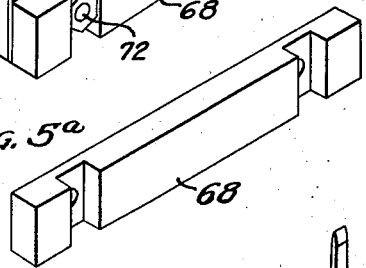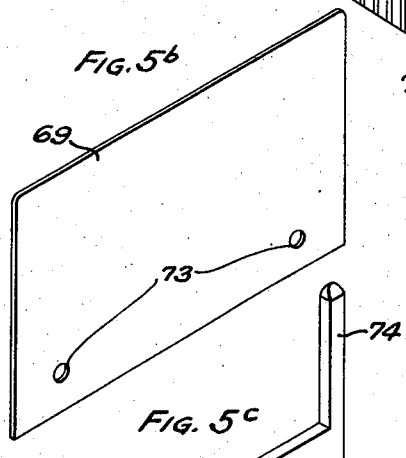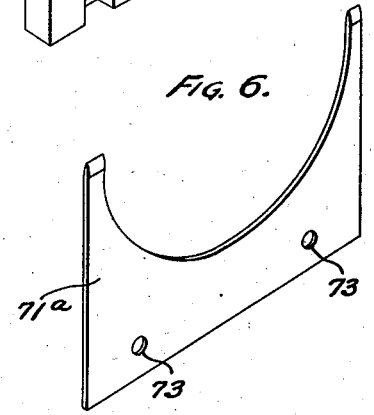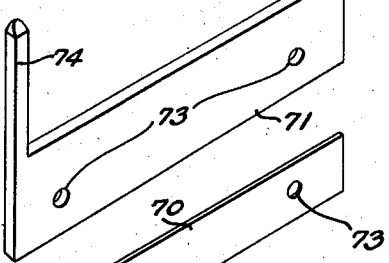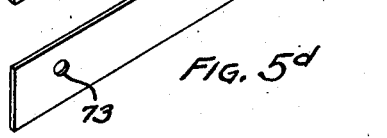

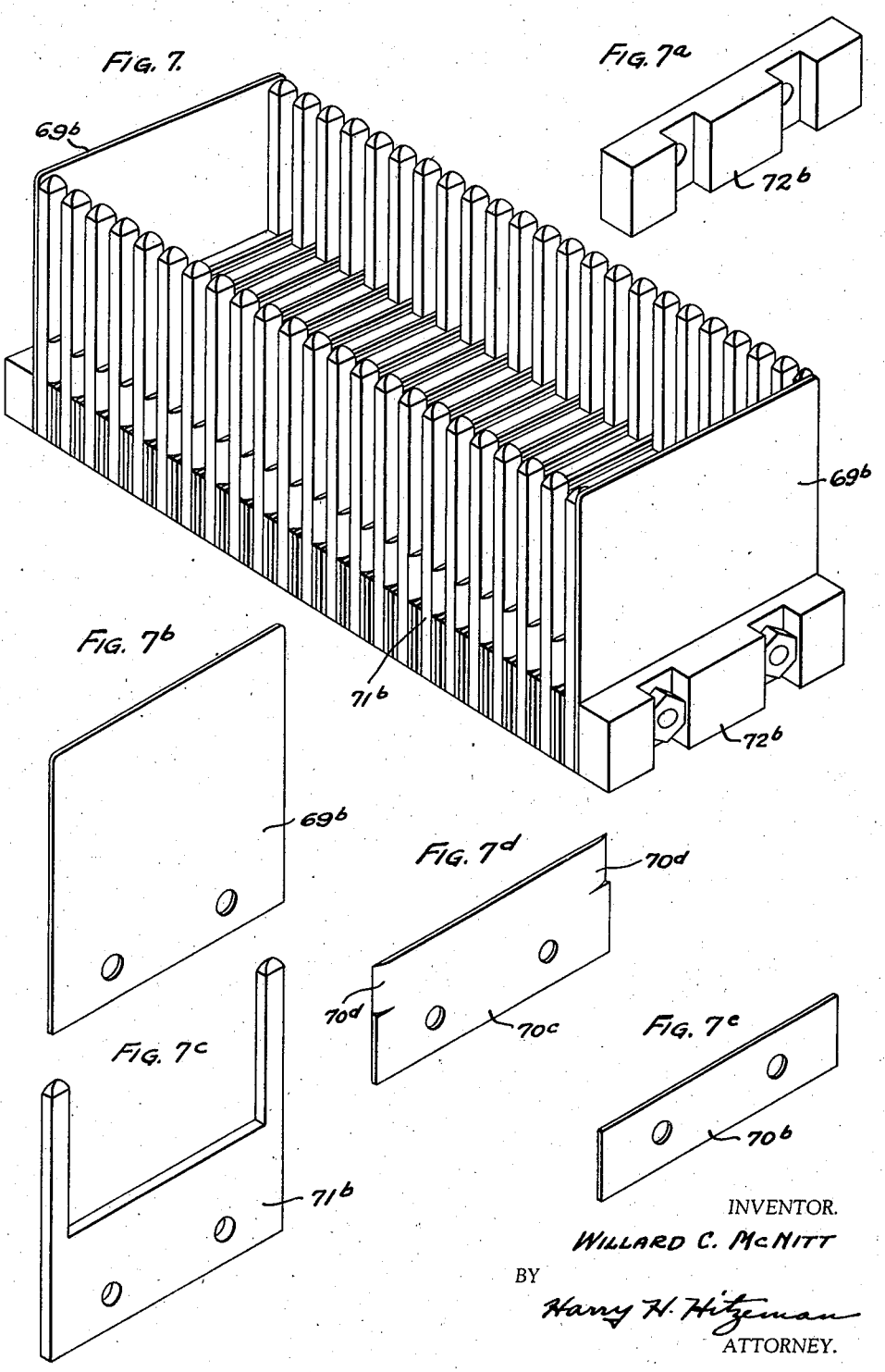

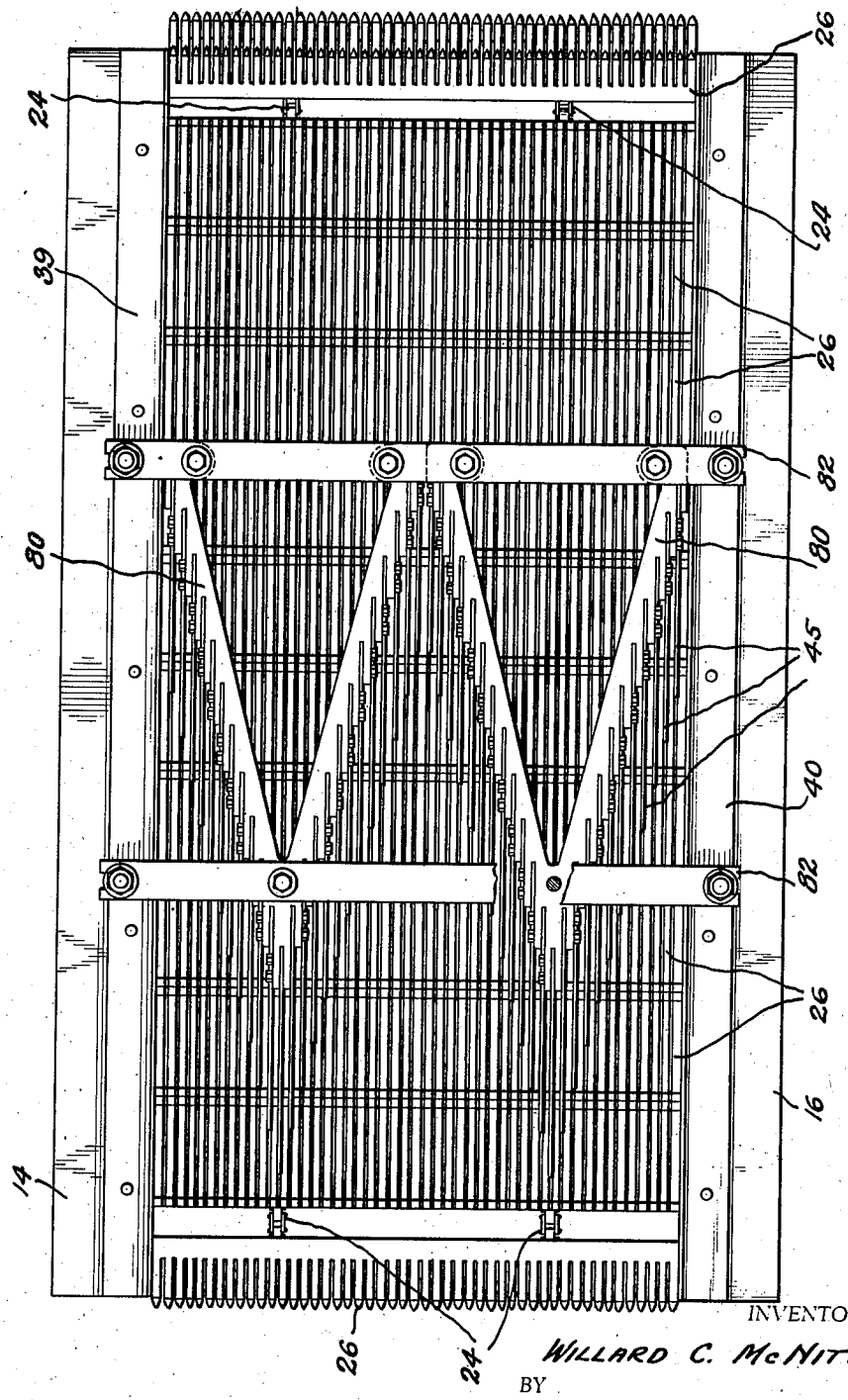

Patented Dec. 14, 1937

2,102,475

UNITED STATES PATENT OFFICE 2,102,475

SLICING MACHINE

Willard C. McNitt, Winnetka, Ill.

Application December 6, 1934, Serial No. 756,195
Renewed May 10, 1937

5 Claims. (Cl. 146—163)

My invention relates to improvements in food slicing machines and similar devices.

My invention relates more particularly to an improved machine of the type specified for slicing food products such as fruits and vegetables either for immediate consumption or for canning and preserving purposes.

In the construction of machines of this type I have discovered certain important requirements to secure successful operation. For use in slicing vegetables generally, I have found that the simplest and most efficient machines require a movable conveyor to which a plurality of pockets or food product containers are secured and which carry the produce to be sliced forward through a row of knives or blade members suitably spaced apart and mounted in diagonal rows. I also found that for certain types of fruits and vegetables a knife arbor in which the knives were mounted in a V-spacing worked very well. On other vegetables and food products of comparative length such as celery, asparagus, rhubarb and other products, an arrangement of knives on a W-shaped arbor was required.

Accordingly an object of my invention is to provide an improved continuously operating slicing machine of the type described.

A further object is to provide an improved arrangement of cutters or knives in connection with a continuously operating feed conveyor.

A further object is to provide an improved conveyor mechanism for carrying food products to be sliced forward to the cutters.

A further object is to provide an improved design and construction of food containers and an improved method of assembling the same.

A further object of the invention is to provide improved means for adjusting the size of slice desired either by changing the knife members or by changing both the knife members and the containers.

A further object of the invention is to provide a mechanism in which the size and shape of the containers can be varied to accommodate different types of food products.

A further object is to provide in a machine of this type an advantageous and compact structure and one whereby the machine may be easily and cheaply built.

A further object is to provide a machine of the type specified capable of operating continuously and upon a plurality of articles at once so that a large production may be obtained.

A further object is to provide in a machine of this type improved conveyor means that may act as cutting gauges to determine the thickness of each slice.

Other objects and advantages will be more apparent from the following description wherein reference is had to the accompanying five sheets of drawings, upon which one embodiment of my invention is illustrated.

In the drawings, Fig. 1 is a central vertical section of a complete slicing machine;

Fig. 2 is an enlarged cross sectional view taken on the lines 2—2 of Fig. 1;

Fig. 3 is a fragmentary plan view of the machine showing the knife arbor and the manner in which the knives engage in the conveyor;

Fig. 4 is a sectional view illustrating the manner in which the knives are adjustably supported;

Fig. 5 is a perspective view of one of the containers which form the conveyor;

Figs. 5a, 5b, 5c, and 5d, are perspective views of the fastening block, the end wall, the knife guide, and the spacer, which are assembled to form the containers shown in Fig. 5;

Fig. 6 is a perspective view of a modified form of knife guide which may be employed with the other parts shown;

Fig. 7 is a perspective view of a modified form of container;

Figs. 7a, 7b, 7c, 7d, and 7e are perspective views of the parts which are assembled together to form the container shown in Fig. 7 and Fig. 8 is a plan view of a modified form of the slicing machine wherein a a pair of V-shaped knife arbors are employed for use in slicing long stemmed articles.

The slicing machine illustrated in Fig. 1 has been designed for slicing the usual vegetables and fruits and particularly beets, carrots, onions, etc., where the slice is made without regard to whether the cut is or is not straight through the center of the core of the product. Accordingly, I provide a pair of sets of base members 10 and 12 which support a frame comprising the angular shaped horizontal frame members 14 and 16. A pair of cross shafts 18 and 20 are journaled in suitable bearings at opposite ends of the frame and may have adjusting means associated therewith whereby the shafts or either one of them may be moved to change the position thereof when it is desired to change the amount of slack in the chain. Each of the shafts 18 and 20 carry a sprocket wheel 22 which is keyed thereon.

An endless chain 24 may be trained around the sprocket wheels 22. This chain may be of any suitable or desirable construction sufficiently heavy and sufficiently strong so that the comparatively heavy containers 26 which I employ may be secured to alternate or separated links to form a continuous conveyor. The containers 26, as most clearly shown in Fig. 2, are secured to the desired links 24 by suitable brackets 28 and screw members 29 which extend into the bottom wall of the containers.

The conveyor is supported at its upper side in a horizontal position by a pair of plate members 30 which are secured to the underside of the frame members 16 and 14. The end blocks 68 of containers 26 ride upon these plates adjacent the inner edges of the top wall of frame members 14 and 16 to accurately guide the conveyor chain in its forward movement. A pair of bar members 36 and 38 as wide as the end blocks 68 are provided directly above these blocks and continue to a point past the forward knives for a purpose which will presently be apparent. A pair of angle members 39 and 40 secured to the upper side of the frame members 14 and 16 may extend the length of the machine to form side enclosures for the conveyor.

A guard or cover member 41 may be secured to the front end of the machine attached at its lower end by means of bolts 42 to the upright members 12 and at its upper end by means of bolts 43 to a pair of stud members 44 which are mounted upon the horizontal frame members 14 and 16.

Articles to be sliced may be placed in the containers 26 at the front end of the machine and are moved forward in the conveyor to a point where they are engaged by a plurality of knife members 45. The knife members which I provide may be mounted as shown in Fig. 3 in an arbor 46 which is supported upon the frame upon spacers 48 and cross bar 49. The arbor is rigidly secured in the position shown by means of bolt members 50.

The knife arbor 46 may be triangular in shape and be provided along its two angular sides 52 with a plurality of parallel slots 53 spaced apart as shown and extending from the front slot 54 to the end slots 55. The arbor is further formed with flattened portions 57 adjacent each slot and with a pair of bolt members 58 and 59 for adjustably supporting the knife members in desired position. As shown in Fig. 4, I provide each of the knife members 45 with a pair of openings 60 and 61. The opening 60, however, is slightly elongated so that the knife is yieldingly held on bolt 59 which may act as a pivot and allow the lower end of the knife to be raised slightly under certain conditions.

The knives are placed on a slant as shown so that a good shearing action may be obtained as they pass through the guides in the containers 26. Another feature in the construction of the knives is that they are not ground to a sharp edge at the extreme tips 45a where they fit into the grooves in the bottom of the containers. They are left at stock thickness at this point so that they may fit snugly into the grooves where they are guided and can not easily be moved sideways, thus insuring uniform thickness of slices. The purpose in mounting the knives in spaced succession on the arbor is so that the slices may move outwardly and away from the knives as fast as they are cut. It has been found that to attempt to force most vegetables through a straight gang of knives at one time results in breaking the slices, making them of uneven thickness and requiring a great deal more effort to operate the machine.

As a safety feature, I provide a screen member 62 which is rectangular in shape and is adapted to cover the knife arbor. It is formed with an open end 63 and a metallic shield member 64 extending downwardly over the rearward end of the knife arbor and knives.

Mechanism for driving the conveyor forward through the knives at a desired continuous rate of speed is provided and comprises the motor M which is formed integral with a reducing mechanism R from which a sprocket wheel 65 may be driven. A drive chain 66 may connect the sprocket wheel 65 with a sprocket wheel (not shown) that is secured to shaft 18 and thereby the motive power to operate the conveyor is obtained. The motor assembly may be mounted upon a suitable support S secured to the upright members 10.

In Fig. 5 I have illustrated one type of container 26 adapted to be carried forward by the chain 24. I have found by experience that the containers must be constructed in an extremely rugged manner and of material which is not easily broken or bent, as otherwise the shearing action of the knives against the material carried thereby has a tendency to force the guides or finger portions out of alignment with the result that they soon become broken or bent and the knives are also materially damaged. To construct the containers from castings and mill out the slots and spacers would be prohibitive from a cost standpoint. Therefore I provide an assembly of cold rolled steel portions which may comprise the end blocks 68, the end wall members 69, spacer members 70, and finger or guard members 71. Thus an assembly of elements 68, 69 and a plurality of alternate spacers 70, and finger portions 71 held together by bolt members 72 constitute a container 26. Each of the parts described is provided with suitable bolt holes 73 through which the bolts 72 are adapted to pass. When the container has been assembled as explained, the assembly is given a coating of tin and in this condition is ready for use.

The finger or guide members 71 are formed as shown with a pair of upright fingers 74 suitably pointed at their upper ends so that the knives 45 will be easily guided downwardly into the space therebetween. The forward fingers of the containers thus serve to act as guards to keep the product in the container until the container turns around the sprocket wheels, whereas the back fingers co-operate with the knives to effect the cutting action on the product. The containers may be made in a variety of different sizes, their spaces being rectangular as shown for some products, and crescent shaped as the finger member 71a shown in Fig. 6 for mushrooms or similar products. The object of this construction is to allow products such as mushrooms to center with their tops down, and prevents the product from wedging in a corner as on the rectangular container and getting pinched or jammed so that it will not fall out when the container falls over.

In Fig. 7 I have shown a modified form of container which is constructed similar to the container shown in Fig. 5. However, in this construction I provide the end blocks 72b, and wall members 69b, spacer members 71b and additional spacer members 70c formed with the tapered end portions 70d so that the lower edges of the knives will not become wedged against the edges of the spacer 70c. With this construction it will be obvious that wider slices may be obtained. It is of course necessary that the knives be adjusted to the same widths as the cutting spaces shown in this embodiment.

In Fig. 8 I have shown a plan view of a modified form of the machine. This construction differs only in the construction heretofore shown and described in that I provide a pair of V-shaped knife arbors 80, supported in the path of the conveyor by a pair of cross bar members 82. In this construction it is also necessary to provide a pair of conveyor chain members 24. The form of the invention shown in Fig. 8 is particularly adaptable for use in cutting long materials such as rhubarb, celery, asparagus and similar food products. By reason of the fact that the knives are spaced as shown, a long article such as a stalk of celery, will be started through the knives at both ends and center simultaneously, and thus will not be turned and become jammed or crushed while going through the cutters.

In connection with the bar members 36 and 38 which extend to a point past the forward knives (see Fig. 1), the purpose of this is to permit articles which are being sliced to expand outwardly without binding against the guide bar on the side of the machines. For this reason in Fig. 1 and Fig. 2, I have shown the containers 26 constructed without the end wall members 69 shown in Fig. 5. It will be understood however that for products which do not require the extra room at this point, containers 26 are constructed as shown with the side wall members 69.

From the showing in the drawings, it can be seen that there is always more than one knife in a vegetable at one time so that the vegetable is always held in position as it starts through the knives. The principal reason for spacing the knives as I have is to produce this result. If a longer spacing were used so that a vegetable would pass through one knife before starting into another, the vegetable would change its position in the container and the slices would not all be of equal thickness. The purpose of providing perfect slices is not only to make a better looking product, but also to eliminate waste, because in a great many canning factories the imperfect slices are either picked out by hand or screened out in an extra operation.

Another feature of my invention is the ease with which the end pieces which are frequently small and irregular, may be removed from the sliced products. Thus, in slicing pickles or cucumbers where the end slices are always removed, the removal of the end slices is made comparatively simple by reason of the fact that the product after it has gone through the knives remains more or less in place so that the end slices can easily be picked off the conveyor or off a picking belt on which the product can be deposited after leaving the slicing machine. It can easily be seen that this is comparatively simple compared to the difficulties encountered by the use of tube slicers which are commonly used in the art. In using tube slicers, the slices are all dropped by gravity after being sliced and thus pile up, and unless immediate attention is given to the sliced products, the removal of end pieces and slivers is a very difficult operation.

From the foregoing it can be seen that applicant has produced an improved slicing machine of the type described which provides absolutely uniform thickness to all slices, thus eliminating slivers and "heel ends". In the tube slicers of the prior art it is customary to provide a revolving knife which slices as the vegetable is dropped by gravity. The vegetable usually moves between each slicing operation and as a result, especially if the knife is revolving at a high rate of speed, slices of different thicknesses are produced. Thus it can be seen that applicant has clearly provided an improved machine over the devices of the prior art.

From the foregoing description, it can be seen that a continuously operating mechanism has been provided and one that will operate with the highest degree of efficiency. Due to the fact that the conveyor is guided throughout its movement past the knife members 45, the correct alignment of the guides with the knives is at all times assured.

While I have illustrated and described a specific embodiment of the invention and the modification for use with longer stemmed products, it is of course understood that various modifications and changes may be made in the mechanism shown, and I do not wish to limit myself to the exact details or arrangements shown; rather, what I desire to secure and protect by Letters Patent of the United States is:

1. A rectangularly shaped open topped container of the class described comprising flat spacers and flat finger members assembled together in alternate relation, each of said finger members comprising a base portion with upstanding fingers at each end thereof forming horizontal bottom and vertical front and rear wall portions of the container, flat plates at each end of the assembly forming end closures for the container and a pair of bolts upon which the end plates, flat spacers and base portions of the finger members are threaded and clamped together in contacting relation.

2. A rectangularly shaped open topped container of the class described comprising flat spacers and flat finger members assembled together in alternate relationship, each of said finger members comprising a base portion with upstanding fingers at each end thereof forming horizontal bottom and vertical front and rear wall portions of the container, flat plates at each end of the assembly forming end closures for the container and means for connecting together said end plates, flat spacers and the base portions of the finger members to form an integral unit.

3. A conveyor comprising an endless chain, a plurality of rectangularly spaced open topped containers mounted upon separated links thereof, each of said containers comprising flat spacers and flat finger members assembled together in alternate relation, each of said finger members comprising a base portion with upstanding fingers at each end thereof forming horizontal bottom and vertical front and rear wall portions of the container, flat plates at each end of the assembly forming end closures for the container and a pair of bolts upon which the end plates, flat spacers and base portions of the finger members are threaded and clamp together in contacting relation.

4. A rectangularly shaped open topped container of the class described comprising flat spacers and flat finger members assembled together in alternate relation, each of said finger members comprising a base portion with upstanding fingers at each end thereof forming horizontal bottom and vertical front and rear wall portions of the container, flat plates at each end of the assembly forming end closures for the container, a pair of block members mounted on the sides of said end plates, and a pair of bolts upon which the block members, the end plates, flat spacers and base portions of the finger members are threaded and clamped together in contacting relation.

5. A rectangularly shaped open topped container of the class described comprising flat spacers and flat finger members assembled together in alternate relation, each of said finger members comprising a base portion with upstanding fingers at each end thereof forming horizontal bottom and vertical front and rear portions of the container, a pair of block members mounted on each end of the assembly forming an end member for the container, and a pair of bolts upon which the block members, flat spacers and base portions of the finger members are threaded and clamped together in contacting relation.

WILLARD C. McNITT.